US009750086B2

(12) United States Patent
Gries

(10) Patent No.: US 9,750,086 B2
(45) Date of Patent: Aug. 29, 2017

(54) ELECTRICAL HEATING DEVICE WITH PRINTED CIRCUIT BOARD AND PTC HEATING ELEMENTS CONNECTED BY CONDUCTOR STRANDS

(71) Applicant: MAHLE International GmbH, Stuttgart (DE)

(72) Inventor: Jean-Philippe Gries, Colmar (FR)

(73) Assignee: MAHLE International GmbH, Stuttgart (DE)

( * ) Notice: Subject to any disclaimer, the term of this patent is extended or adjusted under 35 U.S.C. 154(b) by 56 days.

(21) Appl. No.: 14/683,965

(22) Filed: Apr. 10, 2015

(65) Prior Publication Data

US 2015/0296566 A1 Oct. 15, 2015

(30) Foreign Application Priority Data

Apr. 14, 2014 (EP) .................................... 14290108

(51) Int. Cl.
| | |
|---|---|
| *H05B 1/02* | (2006.01) |
| *H05B 3/06* | (2006.01) |
| *H05B 3/50* | (2006.01) |
| *F24H 3/04* | (2006.01) |

(Continued)

(52) U.S. Cl.
CPC .............. *H05B 3/06* (2013.01); *F24H 3/0447* (2013.01); *H05B 3/50* (2013.01); *B60H 2001/2278* (2013.01); *F24H 3/0429* (2013.01); *F24H 3/0435* (2013.01); *F24H 9/1872* (2013.01); *F24H 2250/04* (2013.01); *H05B 2203/02* (2013.01); *H05B 2203/023* (2013.01)

(58) Field of Classification Search
CPC ...... H05B 3/06; H05B 1/0236; H05B 3/0042; H05B 3/12; H05B 3/50; H05B 2203/02; H05B 2203/023; B60H 2001/2278; F24H 3/0429; F24H 3/0435; F24H 3/0447; F24H 9/1872; F24H 2250/04
USPC ........ 219/202, 203, 494, 496, 504, 505, 541
See application file for complete search history.

(56) References Cited

U.S. PATENT DOCUMENTS 4,733,057 A * 3/1988 Stanzel ................... F24D 13/02
219/213
4,967,176 A * 10/1990 Horsma ............... H01H 33/161
219/553

(Continued)

FOREIGN PATENT DOCUMENTS

| EP | 1 522 440 A1 | 4/2005 |
| EP | 1 626 231 A1 | 2/2006 |
| WO | WO 2012/019854 A1 | 2/2012 |

*Primary Examiner* — Mark Paschall
(74) *Attorney, Agent, or Firm* — Muncy, Geissler, Olds & Lowe, P.C.

(57) ABSTRACT

An electrical heating device for a motor vehicle, which includes at least one heating element and which includes at least one printed circuit board, the printed circuit board having at least one contacting area for establishing an electrical connection between the heating element and an energy source, the heating element having a plurality of PTC heating elements, which are electrically conductively connected to each other by a contact element, the contact element of the heating element being disposed at a distance from the contacting area, an electrically conductive connection between the contact element and the contacting area being established with the aid of a plurality of conductor strands.

10 Claims, 3 Drawing Sheets

(51) Int. Cl.
  *F24H 9/18*  (2006.01)
  *B60H 1/22*  (2006.01)

(56) References Cited

U.S. PATENT DOCUMENTS

| | | | |
|---|---|---|---|
| 7,221,106 B1* | 5/2007 | Nemir | H02M 5/2573 |
| | | | 307/132 R |
| 7,394,044 B2* | 7/2008 | Brun | F24H 3/0405 |
| | | | 219/541 |
| 8,481,898 B2* | 7/2013 | Parker | H05B 3/22 |
| | | | 219/484 |
| 2003/0052121 A1* | 3/2003 | Sopory | H05B 3/0009 |
| | | | 219/505 |
| 2011/0031228 A1* | 2/2011 | Jun | H05B 3/50 |
| | | | 219/201 |

* cited by examiner

ELECTRICAL HEATING DEVICE WITH PRINTED CIRCUIT BOARD AND PTC HEATING ELEMENTS CONNECTED BY CONDUCTOR STRANDS

This nonprovisional application claims priority under 35 U.S.C. §119(a) to European Patent Application No. EP 14290108.1, which was filed on Apr. 14, 2014, and which is herein incorporated by reference.

BACKGROUND OF THE INVENTION

Field of the Invention

The present invention relates to an electrical heating device for a motor vehicle, which includes at least one heating element and at least one printed circuit board, the printed circuit board having at least one contacting area for establishing an electrical connection between the heating element and an energy source, the heating element having a plurality of PTC (positive temperature coefficient) heating elements, which are electrically conductively connected to each other by a contact element.

Description of the Background Art

Electrical heating devices generally have at least one heating element, which may be heated by applying an electrical voltage. The heat may be conducted to a heat sink with the aid of fins or other thermally conductive elements. The heat sink may thus be heated with the aid of the heating element. The electrical heating devices furthermore generally have a regulating device, with the aid of which the electrical voltage may be regulated.

Electrical heating devices which are known in the conventional art often have a connecting system which connects the heating elements to the regulating device and/or to the voltage source. The connecting system may be formed, for example, by a male connecting part and a female connecting part, which are plugged into each other to establish a connection. Mechanical disturbance variables, which act upon the heating device, are generated during the connection of the connecting parts. This takes place, in particular, while the connections are being established or when the connections are released. This may result in damage to the electrical heating device. In particular, if the individual heating elements are connected to the regulating device and/or the voltage source via a shared conductor strand, the mounting or removal of an individual heating element inevitably results in a mechanical load on the other heating elements, which may cause damage.

The connecting system may furthermore be subject to corrosion and exposed to moisture. This is due to the fact that achieving a sufficient sealing of the connecting system is associated with a very high degree of complexity.

The penetration of moisture may result in corrosion and thus cause a malfunction or a failure of the electrical heating device. In particular, with regard to the use of an electrical heating device in motor vehicles, shocks and mechanical disturbance variables must furthermore be expected, which also have a negative impact on the durability of the connecting system. The electrical heating devices are normally used to additionally provide an electrical heating power to the internal combustion engine. In electrically driven motor vehicles, the electrical heating devices may also generate the entire heating power needed.

SUMMARY OF THE INVENTION

It is therefore an object of the present invention to provide an electrical heating device which facilitates an improved connection between the heating elements and the printed circuit board.

An exemplary embodiment of the invention relates to an electrical heating device for a motor vehicle, which includes at least one heating element and which includes at least one printed circuit board, the printed circuit board having at least one contacting area for establishing an electrical connection between the heating element and an energy source, the heating element having a plurality of PTC heating elements, which are electrically conductively connected to each other by a contact element, the contact element of the heating element being disposed at a distance from the contacting area, an electrically conductive connection between the contact element and the contacting area being established with the aid of a plurality of conductor strands.

The conductor strands make it possible to dispose the heating elements at a distance from the printed circuit board. As a result, the heating element may be mechanically decoupled from the printed circuit board. Depending on the design of the conductor strands, a certain mobility between the heating element and the printed circuit board is ensured, whereby it is achieved that an application of force upon the heating element causes only a slight application of force, or none at all, to be generated upon the printed circuit board. This relieves the load on the printed circuit board and the electrical connections.

The conductor strands can be formed by wires which, spaced a distance apart, electrically conductively connect the contact element to the contacting area.

Wires are particularly advantageous, since they permit a great deal of relative movement between the heating element and the printed circuit board. In addition, wires are available in a wide range of formations and are economical to obtain. The connection between two components using wires is furthermore known from a wide range of applications. It is therefore possible to easily establish a durable connection.

The conductor strands can be formed by strap-like elements which, spaced a distance apart, electrically conductively connect the contact element to the contacting area.

Strap-like elements, such as ribbon cables, are advantageous, since they have a larger conductor cross section than do conventional round cables or wires. As a result, more power may be transmitted. Strap-like elements furthermore have the advantage that a relative movement perpendicular to the wide sides of the strap-like elements is easier than a relative movement perpendicular to the narrow sides of the strap-like elements. By using strap-like elements, a direction dependency may thus be produced, a relative movement of the heating elements with respect to the printed circuit board being able to take place with less resistance in a direction defined by the orientation of the strap-like elements than in the other direction.

Conductor elements which have a strap-like design also offer the advantage that they facilitate a better heat dissipation. The strap-like elements have a larger surface than do comparable round conductors. An improved dissipation of the heat produced at the heating elements and/or the power electronics is made possible by the larger surface.

The conductor strands can be made of aluminum. Aluminum offers very good electrical conduction properties. Aluminum is also particularly advantageous, since the contacting areas are likewise often made of aluminum or are provided with an aluminum plating. The contact elements which are used for electrical contacting of the individual PTC heating elements are also generally made of aluminum. This facilitates, in particular, the connection of the conductor strands when using soldering methods and/or gluing methods. Alternatively, the contacting areas may also be gold-plated, for example using the electroless nickel immersion gold (ENIG) method.

In an embodiment, the conductor strands may also be made, in particular, of other materials which have a high electrical conductivity. In particular, copper, among other things, may be used as the material for the conductor strands.

The conductor strands can be disposed in multiple layers, the conductor strands disposed next to each other as well as the conductor strands disposed on top of each other being disposed at a distance from each other. By spacing the conductor strands a distance apart, a higher degree of freedom may be achieved in the relative movement of the heating elements with respect to the printed circuit board, since the movement is not directly hindered by the conductor strands being in contact with each other. Depending on the polarity of the individual conductor strands, a short circuit is also prevented.

An exemplary embodiment provides that the contact element and the contacting area can be disposed at a distance from each other, the distance between the contact element and the contacting area being overcome by the conductor strands. A spacing of the heating elements a distance apart from the printed circuit board is advantageous, in particular, to achieve a mechanical decoupling of the heating elements from the printed circuit board. This is advantageous to achieve a higher durability of the electrical heating device.

The conductor strands can be soldered and/or glued and/or clamped and/or screwed to the contacting area and/or the contact element. An ultrasonic soldering method may particularly preferably be used as the soldering method.

In an embodiment of the invention, the conductor strands having different material thicknesses can be used to establish the electrically conductive connection. Due to the use of conductor strands having different material thicknesses, the relative movement between the heating elements and the printed circuit board may be positively influenced.

In an embodiment of the invention, it may be provided that the individual conductor strands disposed next to each other in a common layer are formed from conductor strands having the same material thickness.

The conductor strands can be spaced a distance apart by spacing elements. Due to spacing elements, it may be prevented, in particular, that the individual conductor strands come into contact with each other. This could result in short circuits, depending on the polarity of the conductor strands. A friction effect may also be achieved by the individual conductor strands coming into contact with each other, which counteracts the possible relative movement between a heating element and the printed circuit board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of FIG. 1 shows a perspective view of an electrical heating device, the heating elements each being connected to one contacting area of the printed circuit board with the aid of a plurality of cables.

DETAILED DESCRIPTION

Figure 1:
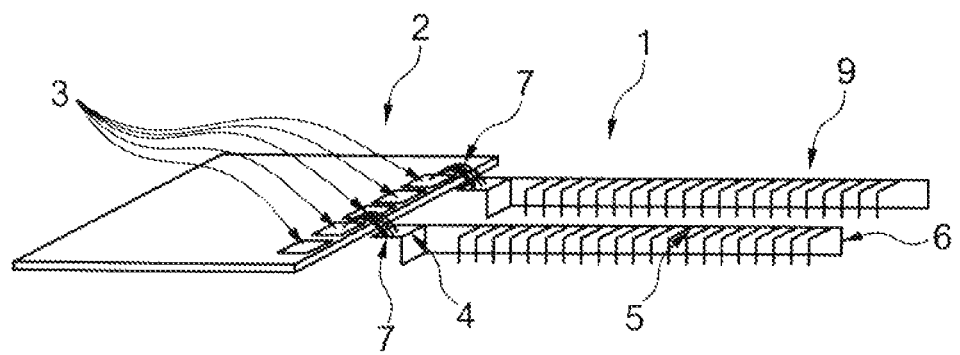

FIG. 1 shows a perspective view of an electrical heating device 1. The electrical heating device essentially comprises a printed circuit board 2, to which a plurality of heating elements 9 are connected. In the example in FIG. 1, two heating elements 9 are connected to printed circuit board 2.

Heating elements 9 essentially comprise a plurality of PTC heating elements 6, which are disposed along a frame or a guiding apparatus. Heating elements 9 furthermore have a plurality of fins 5, which are used for the purpose of heat radiation or heat transfer.

PTC heating elements 6 are electrically contactable with the aid of a contact element 4 or multiple contact elements 4. These contact elements 4 may be formed, for example, by a thin, sheet-like element, to which PTC heating elements 6 may be electrically conductively connected. One PTC heating element 6 is preferably connected to two contact elements 4, one of contact elements 4 being electrically conductively connected to a positive pole of a voltage source, and the other contact element 4 being electrically conductively connected to a negative pole of a voltage source. In alternative embodiments, it may also be provided that the PTC heating element is connected to only one contact element having one polarity, while the electrically conductive connection to the other polarity is implemented by alternative conductor structures. The alternative conductor structure may be formed, for example, by fins 5.

In the example in FIG. 1, contact element 4 is an angularly bent rail, to which fins 5 are connected on one side, and to which PTC heating elements 6 are connected on the opposite side facing away from the viewer. Contact element 4 furthermore has an angularly bent area, which is electrically conductively connectable to contacting area 3 of printed circuit board 2.

Printed circuit board 2 has multiple contacting areas 3. These are connected to an energy source, which is not illustrated, via printed conductors on printed circuit board 2. The printed conductors are also not shown in FIG. 1.

According to the invention, in the exemplary embodiment in FIG. 1, the electrically conductive connection between one contact area 3 and one contact element 4 is established by an arrangement of a plurality of conductor strands 7, each of which is connected to one of contact elements 4 and one of contacting areas 3.

In the exemplary embodiment in FIG. 1, conductor strands 7 are formed by thin wires, which are, for example, soldered, glued, clamped or screwed to contacting areas 3 or contact elements 4. A connection which is produced by an ultrasonic welding method is particularly advantageous. Conductor strands 7 are disposed at a distance from each other. Each of contact elements 4 is connected to one contacting area 3 with the aid of a plurality of conductor strands 7.

This achieves the fact that, in particular contact elements 4 may be disposed at a distance from contacting areas 3 or from printed circuit board 2. Conductor strands 7 may be designed without any insulation, or they may also have insulation outside the contact areas with a contact element 4 or contacting area 3 for the purpose of avoiding short circuits with surrounding structures.

Figure 2:
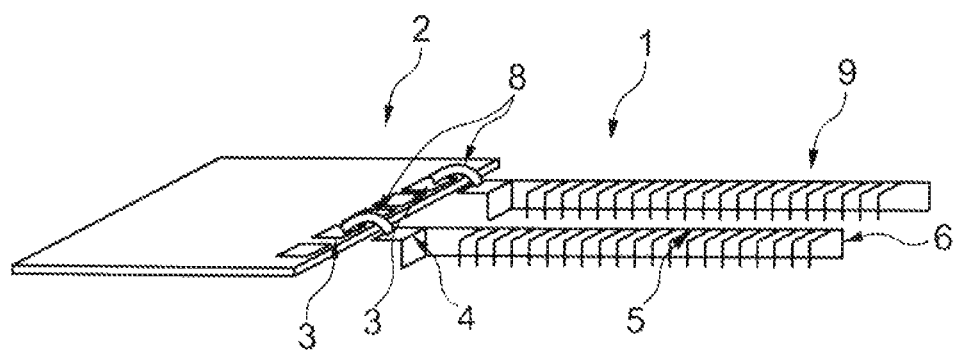
FIG. 2 shows a perspective view of an electrical heating device, the heating elements each being connected to one contacting area of the printed circuit board with the aid of a strap-like conductor strand.

FIG. 2 shows an alternative specific embodiment of an electrical heating device 1. The basic structure of the specific embodiment in FIG. 2 corresponds to the structure in FIG. 1. The reference numerals are therefore used similarly. In contrast to FIG. 1, conductor strands 8 in FIG. 2 are now not formed by thin wires 7 but by strap-shaped conductor segments, each of which is connected to one contacting area 3 and one contact element 4.

In the exemplary embodiment in FIG. 2, one conductor strand 8 is disposed on each contact element 4. In deviating embodiments, a plurality of conductor strands may also be provided in each case between one contact element and one contacting area. Conductor strands 8, which are designed as strap-shaped elements, offer, in particular, a higher stability and, in addition to electrical conduction, may also develop a stabilizing effect between printed circuit board 2 and heating elements 9.

Figure 3:
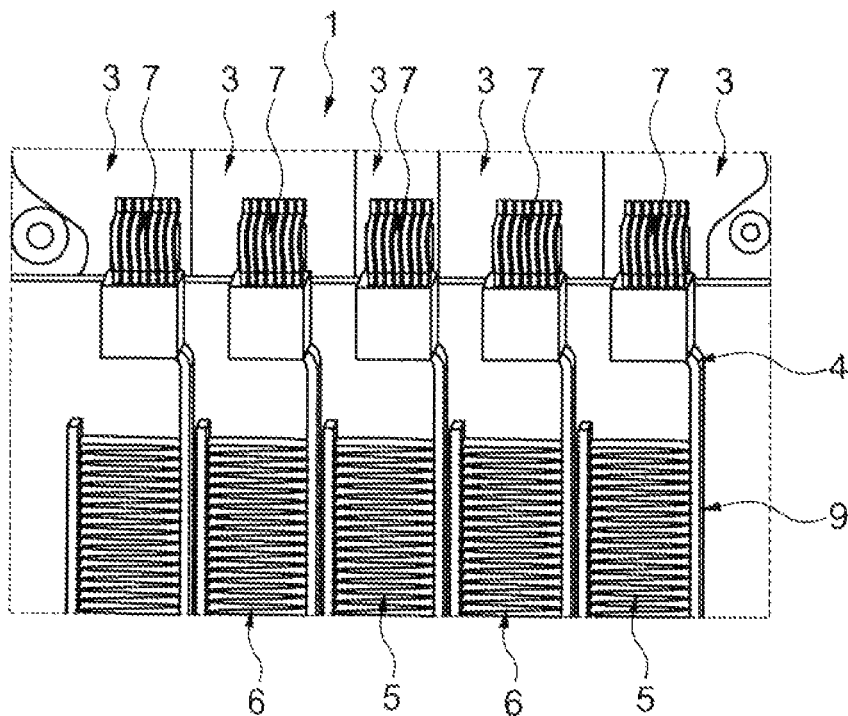
FIG. 3 shows a top view of the contacting areas of a printed circuit board, the heating elements each being connected to one contacting area by a plurality of conductor strands, which are formed by wires.

FIG. 3 shows a detailed view of one specific embodiment according to FIG. 1. Five heating elements 9 are disposed next to each other, each of which has a plurality of fins 5 and a plurality of PTC heating elements 6, this plurality not being shown. PTC heating elements 6 are supplied with an electrical voltage via contact elements 4. A plurality of conductor strands 7 are run parallel to each other between each of contact elements 4 and higher-level contacting areas 3, whereby an electrically conductive connection is established. Conductor strands 7 are, in particular, wire-shaped and are preferably formed by wire pieces having round or rectangular cross sections. Individual conductor strands 7 are disposed, in particular, at a distance from each other and have a curved design.

Contact elements 4 are disposed directly adjacent to contacting areas 3 but are not independently in electrically conductive or physical contact with contacting areas 3. The electrically conductive connection is established entirely by conductor strands 7.

Figure 4:
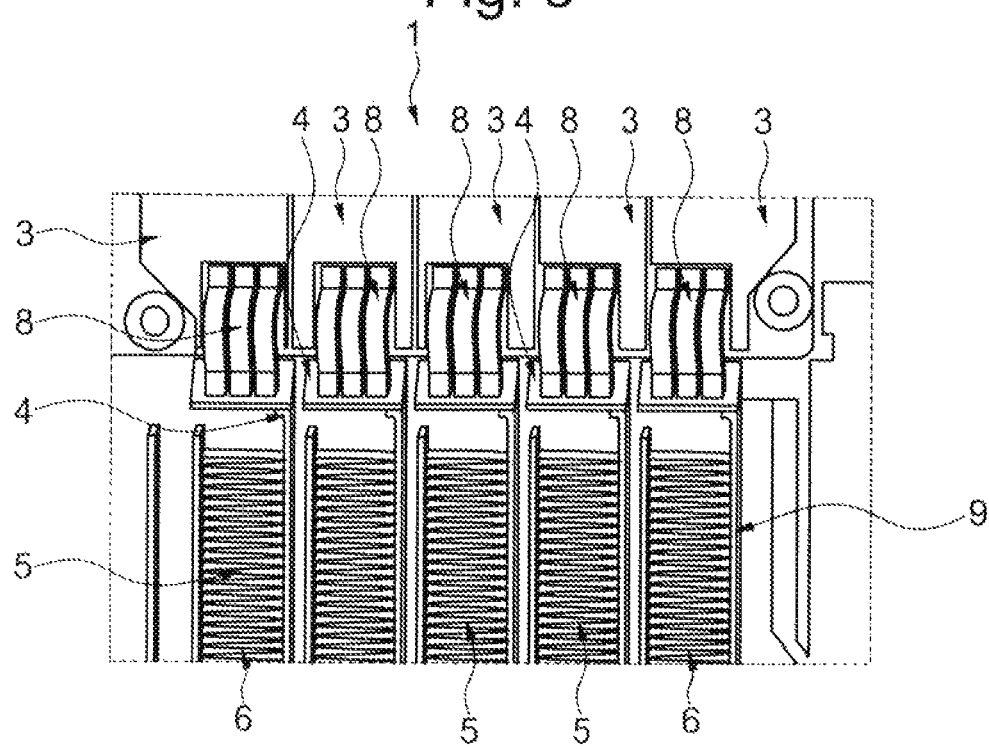
FIG. 4 shows a top view according to FIG. 3, the heating elements each being connected to the contacting areas by a plurality of strap-like conductor strands.

FIG. 4 shows a top view of an electrical heating device 1 according to the exemplary embodiment in FIG. 3. In contrast to FIG. 3, only strap-shaped material sections are used as conductor strands 8 in FIG. 4. Contact elements 4 are each connected to individual contacting areas 3 via three strap-shaped conductor strands 8 disposed in parallel next to each other. The structure of the heating elements 9 shown below corresponds to that in FIG. 3.

Figure 5:
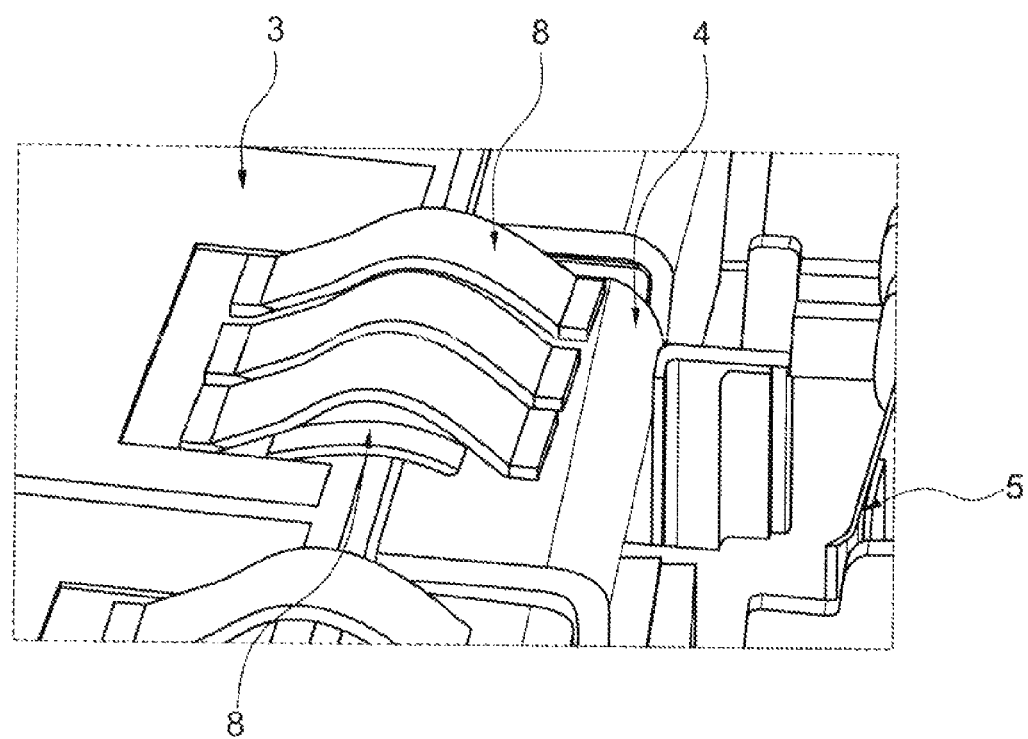
FIG. 5 shows a side view of a connection between a heating element and a contacting area, the strap-like conductor strands being disposed above each other in multiple layers.

FIG. 5 shows a perspective view of the electrical heating device in FIG. 4. In particular, it is apparent in FIG. 5 that conductor strands 8 are disposed in multiple layers. Shorter conductor strands 8 are thus illustrated in the lower area, which connect contacting areas 3 to particular contact elements 4. A second layer of longer conductor strands 8 is disposed thereabove, which have a curved design and establish another connection between contacting areas 3 and contact elements 4. As is apparent in the exemplary embodiment in FIG. 5, the conductor strands are, in particular, soldered to contacting areas 3 or contact elements 4. Individual conductor strands 8 are disposed at a distance from each other. This applies both to side-by-side conductor strands 8 within a layer and to the individual layers with respect to each other. Lower, shorter conductor strands 8 are not in physical contact with upper, curved, longer conductor strands 8.

In alternative specific embodiments, spacing elements may be provided, which space the individual conductor strands at a distance from each other. These spacing elements may either have an electrically non-conductive design or they may be electrically conductive, provided that all conductor strands have only one polarity. In alternative specific embodiments, both the positive pole and the negative pole of an energy source may furthermore be connected to the contact element or to terminals on the contact element assigned to the individual poles with the aid of conductor strands. In this way, a connection of the heating elements to both the positive pole and the negative pole of an energy source may be implemented. In this case, in particular, a spacing element having non-conductive properties should be used to avoid a short circuit due to a relative movement of the conductor strands with respect to each other.

In alternative specific embodiments, it is furthermore possible to provide that conductor strands are disposed on both the upper side and the lower side of the contacting area of the printed circuit board and are also connected to the upper side and the lower side of the contact element.

The exemplary embodiments in FIGS. 1 through 5 are, in particular, examples and are intended to clarify the idea of the invention. The exemplary embodiments in FIGS. 1 through 5 are no limiting, in particular with regard to the number of conductor strands shown, the formation of the conductor strands and the material selection and design of the individual conductor strands.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical heating device for a motor vehicle, the device comprising:
   at least one heating element;
   at least one printed circuit board having at least one contacting area for establishing an electrical connection between the heating element and an energy source; and
   a plurality of PTC heating elements that are electrically conductively connected to each other by a contact element, the contact element of the heating element being arranged at a distance from the contacting area,
   wherein an electrically conductive connection is established between the contact element and the contacting area via a plurality of conductors that extend from the contact element to the contacting area,
   wherein each of the conductors is a wire, such that the contacting area is electrically conductively connected to the contact element by a plurality of wires, and wherein the plurality of wires are spaced apart from one another.

2. An electrical heating device for a motor vehicle, the device comprising:
   at least one heating element;

at least one printed circuit board having at least one contacting area for establishing an electrical connection between the heating element and an energy source; and a plurality of PTC heating elements that are electrically conductively connected to each other by a contact element, the contact element of the heating element being arranged at a distance from the contacting area, wherein an electrically conductive connection is established between the contact element and the contacting area via a plurality of conductors that extend from the contact element to the contacting area, wherein each of the conductors is a strap-like element, such that the contacting area is electrically conductively connected to the contact element by a plurality of strap-like elements, and wherein the plurality of strap-like elements are spaced apart from one another.

3. The electrical heating device according to claim 1, wherein the conductors are made of aluminum.

4. The electrical heating device according to claim 2, wherein the conductors are arranged in multiple layers, and wherein the conductors arranged next to each other as well as the conductors arranged on top of each other are arranged at a distance from each other.

5. The electrical heating device according to claim 1, wherein the contact element and the contacting area are arranged at a distance from each other, and wherein the distance between the contact element and the contacting area are overcome by the conductors.

6. The electrical heating device according to claim 1, wherein the conductors are soldered or glued or clamped or screwed to the contacting area or to the contact element.

7. The electrical heating device according to claim 1, wherein conductors having different material thicknesses are used to establish the electrically conductive connection.

8. The electrical heating device according to claim 4, wherein the individual conductors arranged next to each other in a common layer are formed by conductors having a same material thickness.

9. The electrical heating device according to claim 1, wherein the conductors are spaced a distance apart by spacing elements.

10. An electrical heating device for a motor vehicle, the device comprising:

at least one printed circuit board having at least two contacting areas for establishing an electrical connection;

at least two contact elements, each of the at least two contact elements having PTC heating elements that are electrically conductively connected to each other, wherein the at least two contact elements are arranged at a distance from the at least two contacting areas, wherein an electrically conductive connection is established between one of the at least two contact elements and one of the at least two contacting areas via a plurality of wires, and wherein the plurality of wires are spaced apart from one another.

* * * * *